(12) United States Patent
Huang et al.

(10) Patent No.: US 9,215,586 B2
(45) Date of Patent: Dec. 15, 2015

(54) METHOD OF OBTAINING DATA OF HOME APPLIANCE

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Yunlin (TW); Yu-Chin Tsai, Kaohsiung (TW)

(73) Assignee: GRAND MATE CO., LTD., Taichung (TW)

( * ) Notice: Subject to any disclaimer, the term of this patent is extended or adjusted under 35 U.S.C. 154(b) by 0 days.

(21) Appl. No.: 14/260,129

(22) Filed: Apr. 23, 2014

(65) Prior Publication Data
US 2015/0072649 A1    Mar. 12, 2015

(30) Foreign Application Priority Data

Sep. 11, 2013  (TW) .............................. 102132814 A

(51) Int. Cl.
H04W 12/02  (2009.01)
H04W 12/06  (2009.01)
H04L 12/28  (2006.01)

(52) U.S. Cl.
CPC ........... *H04W 12/02* (2013.01); *H04L 12/2803* (2013.01); *H04W 12/06* (2013.01)

(58) Field of Classification Search
CPC ... H04W 12/02; H04W 12/06; H04L 12/2803
See application file for complete search history.

(56) References Cited

U.S. PATENT DOCUMENTS

2013/0046412 A1* 2/2013 Chan et al. .................... 700/286

* cited by examiner

*Primary Examiner* — Marcos Torres
(74) *Attorney, Agent, or Firm* — Ming Chow; Sinorica, LLC

(57) ABSTRACT

A method of obtaining data of a home appliance, which includes the following steps: Sense the home appliance to obtain running data, and transmit the running data to an interpreter; save the running data in a memory of the interpreter as a plurality of history logs; connect a specific electronic device to the interpreter via a network; send a retrieval command to the interpreter; transmit at least one history log to the electronic device according to the retrieval command. With such design, repairmen can only obtain the history logs which are helpful for repairing and maintenance under authentication.

15 Claims, 3 Drawing Sheets

METHOD OF OBTAINING DATA OF HOME APPLIANCE

The current application claims a foreign priority to the patent application of Taiwan No. 102132814 filed on Sep. 11, 2013.

BACKGROUND OF THE INVENTION

1. Technical Field

The present invention relates generally to a home appliance, and more particular to a method of obtaining data of a home appliance.

2. Description of Related Art

FIG. 1 shows a conventional monitoring system 1 of a home appliance, which includes a water heater 10 (as an example of the home appliance), a computer 11 and a monitoring unit 12. The water heater 10 and the computer 11 are located at a user end and are connected to the monitoring unit 12, which is located at a service end, through Internet. Running data of the water heater 10 are collected by the computer 11 and are transmitted to the monitoring unit 12 through Internet. The monitoring unit 12 records the running data from the user end, and a service person 14 informs the user via a phone 15 once an abnormality is found by the monitoring unit 12.

The advantage of the conventional monitoring system 1 is that the service end is able to provide a good service by acquiring the running data of the home appliance. However, it might leak out some information of the user and invade his/her privacy, such as the time when the user stays at home, and the usage habits of the home appliance of the user. If such information is obtained by outlaws, it may cause damages of the user.

BRIEF SUMMARY OF THE INVENTION

In view of the above, the primary objective of the present invention is to provide a method of obtaining data of a home appliance, which can monitor the home appliance without invading the privacy of the user.

The secondary objective of the present invention is to provide a method of obtaining data of a home appliance, which keeps useful logs of the running data of the home appliance for repairing and maintenance purposes.

The present invention provides a method of obtaining data of a home appliance, which includes the following steps: A. Continuously sense the home appliance to obtain running data of the home appliance and transmit the running data to an interpreter; B. Save the running data as a plurality of history logs; C. Connect an electronic device to the interpreter; D. Send a retrieval command from the electronic device to the interpreter via a network; and E. Transmit at least one history log from the interpreter to the electronic device according to the retrieval command.

With such design, the history logs of the home appliance can only be retrieved under authentication, which fully protects the privacy of the user. Furthermore, the history logs are helpful for repairmen to determine the usage condition of the home appliance, which could be useful for repairing and maintenance.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
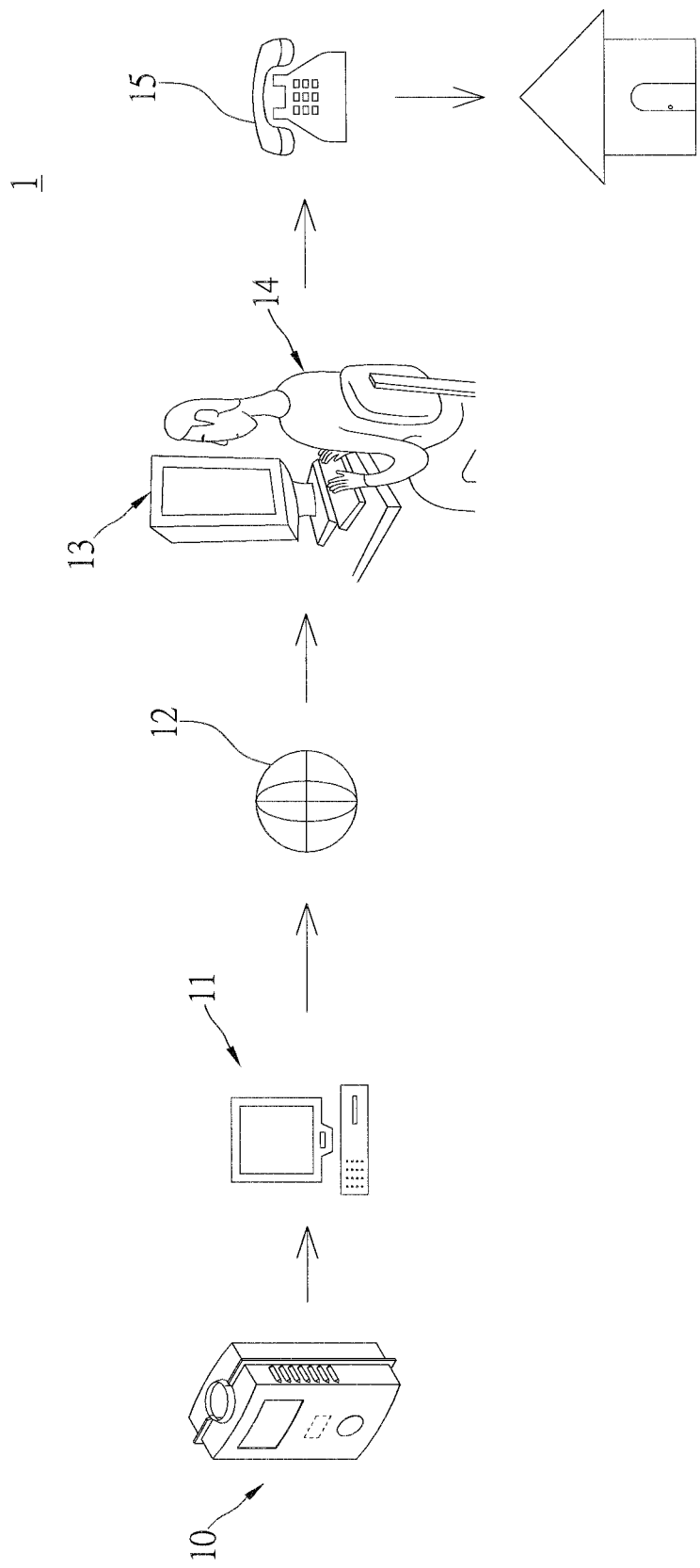
FIG. 1 is a sketch diagram of the conventional monitoring system of the home appliance.
Figure 2:
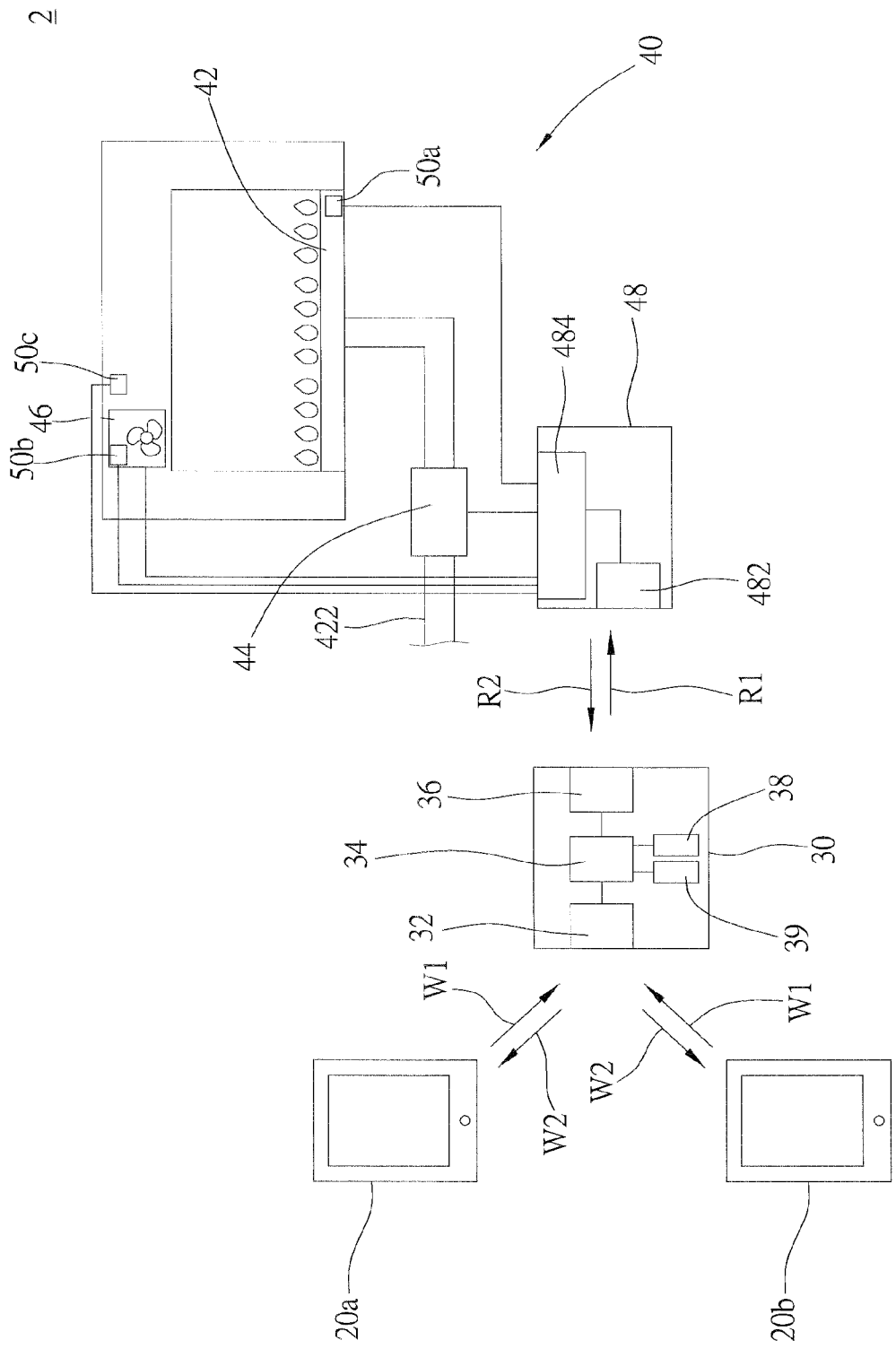
FIG. 2 is sketch diagram of a first preferred embodiment of the present invention.

As shown in FIG. 2, a monitoring system 2 of a home appliance of the first preferred embodiment of the present invention includes a first electronic device 20a, a second electronic device 20b, an interpreter 30, and a gas fireplace 40. Except for the gas fireplace, the aforementioned home appliance may be gas water heater, electric water heater, air conditioner, or any equivalent equipment.

In the first embodiment, the first and the second electronic devices 20a, 20b are smart phones. The first electronic device 20a is held by an owner of the home appliance. The first electronic device 20a is installed with a first application, which allows the owner to input a control command, such as turning on/off, increasing/decreasing flames, or adjusting airflow, and the first application converts the control command into a Wi-Fi control signal W1 for sending out. The second electronic device 20b is held by a repairman at a service station of the home appliance. The second electronic device 20b is installed with a second application (a monitoring application), which has not only the same functions with the first application, but also advanced control functions. In practice, the first and the second electronic devices 20a, 20b may be any devices which are capable of receiving and transmitting Wi-Fi signals, such as desktops, laptops, tablets, or PDAs.

The interpreter 30 has a Wi-Fi transceiver 32, a converter 34, a first radio frequency (RF) transceiver 36, a memory 38, and a timer 39. The converter 34 is electrically connected to the Wi-Fi transceiver 32, the first RF transceiver 36, the memory 38, and the timer 39 respectively.

The Wi-Fi transceiver 32 is wirelessly connected to the first and the second electronic devices 20a, 20b to receive the Wi-Fi control signal W1 from the first and the second electronic devices 20a, 20b. The converter 34 converts the Wi-Fi control signal W1 into a radio frequency (RF) control signal R1, and the first RF transceiver 36 sends the RF control signal R1 out.

The gas fireplace 40 includes a burner 42, a gas valve, 44, a fan 46, a controller 48, and a plurality of sensors 50a, 50b, 50c.

The burner 42 burns gas from a gas pipe 422, and the gas valve 42 is provided in the gas pipe 422 to adjust a gas flow in the gas pipe 422. The fan 46 blows the hot air heated by the burner 42 to the room. The gas valve 42 and the fan 46 are controlled by electric signals.

The controller 48 has a second radio frequency (RF) transceiver 482 and a controlling module 484. The controlling module 484 is electrically connected to the gas valve 42 and the fan 46 respectively. The second RF transceiver 482 receives the RF control signal R1 from the first RF transceiver 36 of the interpreter 30 and transfers it to the controlling module 484. The controlling module 484 translates the RF control signal R1 and generates control electric signals to control the gas valve 42 and/or the fan 46 accordingly, such as turning on/off the gas valve 44, increasing/decreasing the gas flow through the gas valve 44, turning on/off the fan 46, adjusting the speed of the fan 46, and so on.

The sensors 50a-50c are electrically connected to the controlling module 484 to sense running data of the gas fireplace 40. The sensor 50a senses the flames of the burner 42, the sensor 50b senses the speed of the fan 46, and the sensor 50c senses a temperature in the room. It is easy to understand that it may provide more sensors to acquire more running data.

The controlling module 484 periodically converts the running data sensed by the sensors 50a-50c into RF data signals R2, and sends the RF data signals R2 to the interpreter 30 through the second RF transceiver 482.

The first RF transceiver 36 receives the RF data signals R2, and the converter 34 translates the RF data signals R2 back into the running data and save them in the memory 38 as history logs. The history logs include time stamps obtained from the timer 40. Each time stamp indicates a time point when each RF data signal R2 is received by the interpreter 30. At the same time, the converter 34 converts the RF data signals R2 into Wi-Fi data signal W2, and sends them to the first electronic device 20a and/or the second electronic device 20b through the Wi-Fi transceiver 32.

The first and the second electronic devices 20a, 20b receive the Wi-Fi data signal W2 and translates them to show the running data of the gas fireplace on screens.

The advanced control functions of the second application allow the repairman to access the memory 38 and acquire the history logs under authentication. In the beginning, the second application generates an authentication-requiring command, which is converted into a Wi-Fi control signal W1 and transmitted to the interpreter 30. The Wi-Fi transceiver 32 receives the Wi-Fi control signal W1, and the converter 34 translates the Wi-Fi control signal W1 back into the authentication-requiring command. For now, the second electronic device 20b is authenticated to access the memory 38.

Then the second application generates a retrieval command, which is also converted by the second electronic device 20b into the Wi-Fi control signal W1 and sent to the interpreter 30. When the interpreter 30 receives the Wi-Fi control signal W1, the converter 34 will translate the Wi-Fi control signal W1 back into the retrieval command, and convert the history logs corresponding to the retrieval command into the Wi-Fi data signal W2, and then send the Wi-Fi data signal W2 to the second electronic device 20b through the Wi-Fi transceiver 32. The second application translates the Wi-Fi data signal W2 to show the obtained history logs on the screen. Therefore, the repairman may realize some functional problems of the gas fireplace 40 according to the history logs. For instance, if the owner found the gas fireplace 40 is malfunctioned, but the gas fireplace 40 works normally when the repairman arrives for repairing. The repairman may send the retrieval command which specifies a timeslot through the second electronic device 20b, and obtain the history logs with time stamps corresponding to the timeslot to find the real problem of the gas fireplace 40.

The advanced control functions of the second application further includes statistics of the history logs. In this function, the time stamps of the history logs will be collected to calculate a total operating time of the gas fireplace 40.

In practice, the owner could set a verifying password, and save the verifying password in the memory 38 of the interpreter 30. Before the repairman being authenticated to obtain the history logs, he/she has to send a password to the interpreter 30, and the converter 34 is responsible to verify the password and the preset verifying password. Only when the password is identical to the verifying password, the repairman could be authenticated to access the history logs.

Therefore, only the authorized person may access the memory 38 of the interpreter 30. It may protect the privacy of the owner.

Figure 3:
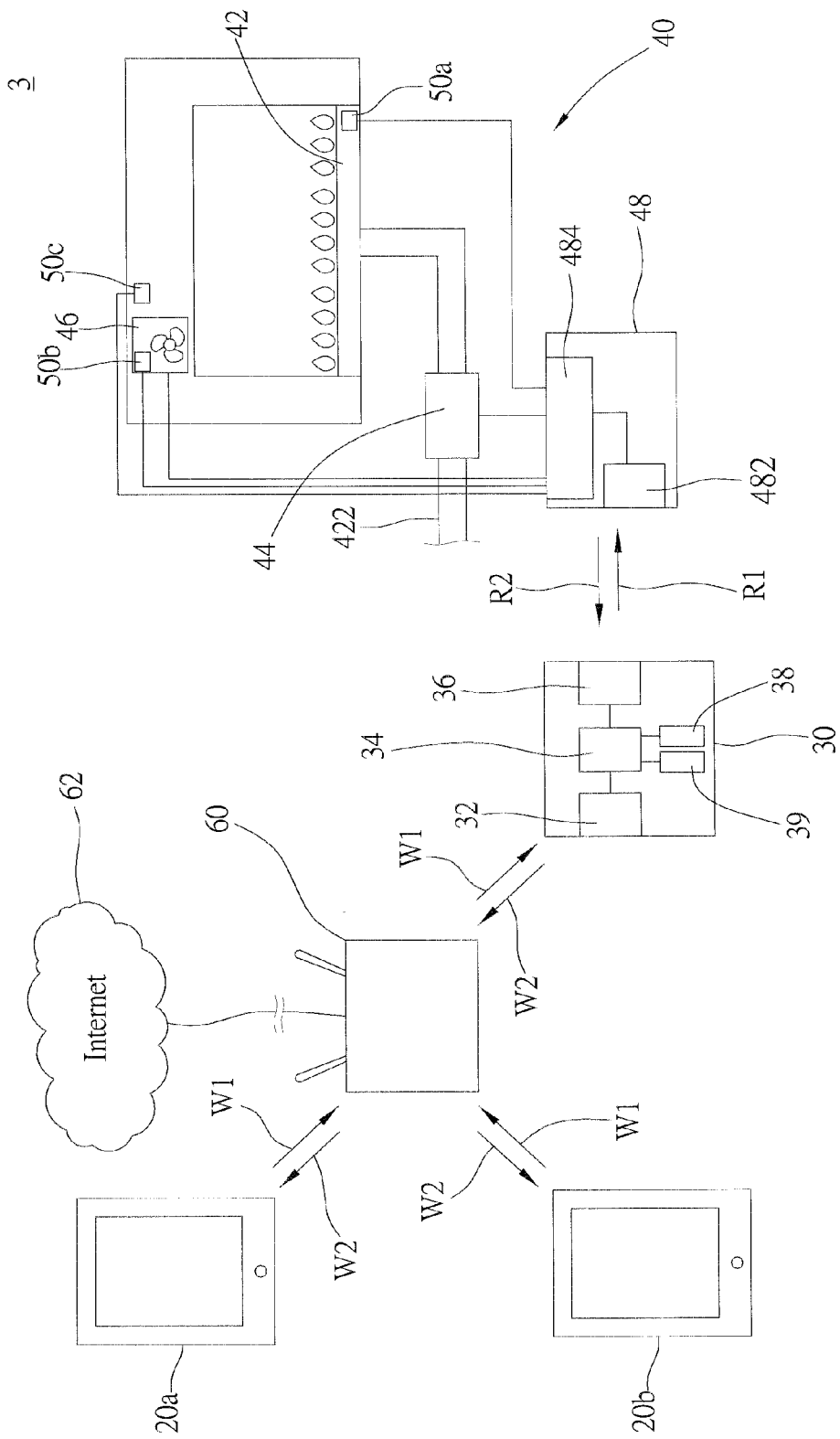
FIG. 3 is a sketch diagram of a second preferred embodiment of the present invention.

FIG. 3 shows a monitoring system 3 of the second preferred embodiment of the present invention, which is similar to the first preferred embodiment, except that the monitoring system 3 further includes a wireless access point (wireless AP) 60. The wireless AP 60 is connected to a network (Internet) 62, and the first and the second electronic devices 20a, 20b are connected to the network through the wireless AP 60. The interpreter 30 is connected to the network, therefore the first and the second electronic devices 20a, 20b are in connection with the interpreter 30 through the wireless AP 60 and the network. The rest of the monitoring system 3 is the same as the system 2 of the first preferred embodiment. The advantage to apply the wireless AP 60 is that the first and the second electronic devices 20a, 20b may connect to Internet through the wireless AP 60 without affecting the network connecting functions of the first and the second electronic devices 20a, 20b. Specifically, the internet in the second preferred embodiment is WLAN (wireless local area network), and the retrieval command and the history logs are carried by Wi-Fi signals. In another embodiment, the internet could be LAN (local area network) as well.

In an embodiment, the interpreter 30 may connect to a plurality of home appliances to control and monitor these home appliances at the same time. Furthermore, the memory 38 of the interpreter 30 may save the history logs of all the home appliances.

It must be pointed out that the embodiments described above are only some preferred embodiments of the present invention. All equivalent structures which employ the concepts disclosed in this specification and the appended claims should fall within the scope of the present invention.

What is claimed is:

1. A method of obtaining data of a home appliance, comprising the steps of:
    A. continuously sensing the home appliance to obtain running data of the home appliance and transmitting the running data to an interpreter;
    B. saving the running data as a plurality of history logs;
    C. connecting an electronic device to the interpreter;
    D. sending a retrieval command from the electronic device to the interpreter via a network;
    E. transmitting the specific history log from the interpreter to the electronic device according to the retrieval command; and
    wherein the running data are transmitted to the interpreter periodically in the step A; the history logs include the running data and a time stamp of each transmission; and a total operating time of the home appliance is calculated according to the time stamps of the history logs in the step E.

2. The method of claim 1, further comprising the step of sending an authentication-requiring command to the interpreter for requiring the authentication needed for retrieving the history logs before the step D.

3. The method of claim 2, wherein the electronic device generates the authentication-requiring command by executing an application.

4. The method of claim 1, further comprising the step of sending a password to the interpreter to obtain the authentication needed for retrieving the history logs before the step D.

5. The method of claim 1, wherein the retrieval command specifies a timeslot; in the step E, the history logs with time stamps corresponding to the timeslot specified by the retrieval command are retrieved.

6. The method of claim 1, wherein the network is a local area network (LAN).

7. The method of claim 6, wherein the network is a wireless local area network (WLAN), and the retrieval command in the D and the history logs in the step E are carried by Wi-Fi signals.

8. The method of claim 1, wherein the running data are transmitted from the home appliance to the interpreter via radio frequency signals.

9. A method of obtaining data of a home appliance, comprising the steps of:
   A. continuously sensing the home appliance to obtain running data of the home appliance and transmitting the running data to an interpreter;
   B. saving the running data as a plurality of history logs;
   C. connecting an electronic device to the interpreter;
   D. sending a retrieval command from the electronic device to the interpreter via a network; and
   E. transmitting the specific history log from the interpreter to the electronic device according to the retrieval command;
   wherein the running data are transmitted to the interpreter periodically in the step A; the history logs include the running data and a time stamp of each transmission; the retrieval command specifies a timeslot; in the step E, the history logs with time stamps corresponding to the timeslot specified by the retrieval command are retrieved.

10. The method of claim 9, further comprising the step of sending an authentication-requiring command to the interpreter for requiring the authentication needed for retrieving the history logs before the step D.

11. The method of claim 10, wherein the electronic device generates the authentication-requiring command by executing an application.

12. The method of claim 9, further comprising the step of sending a password to the interpreter to obtain the authentication needed for retrieving the history logs before the step D.

13. The method of claim 9, wherein the network is a local area network (LAN).

14. The method of claim 13, wherein the network is a wireless local area network (WLAN), and the retrieval command in the D and the history logs in the step E are carried by Wi-Fi signals.

15. The method of claim 9, wherein the running data are transmitted from the home appliance to the interpreter via radio frequency signals.

* * * * *